UNITED STATES PATENT OFFICE.

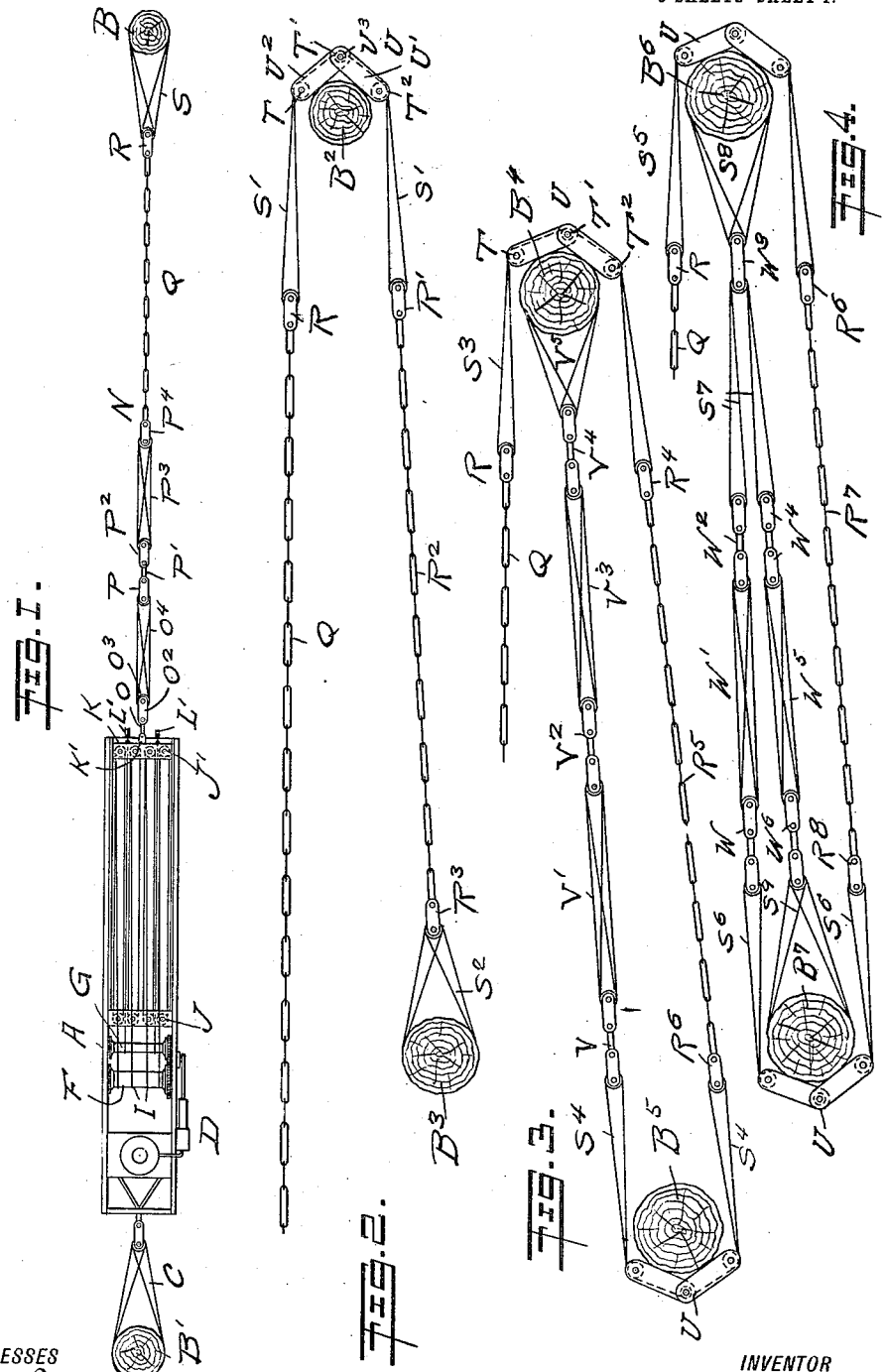

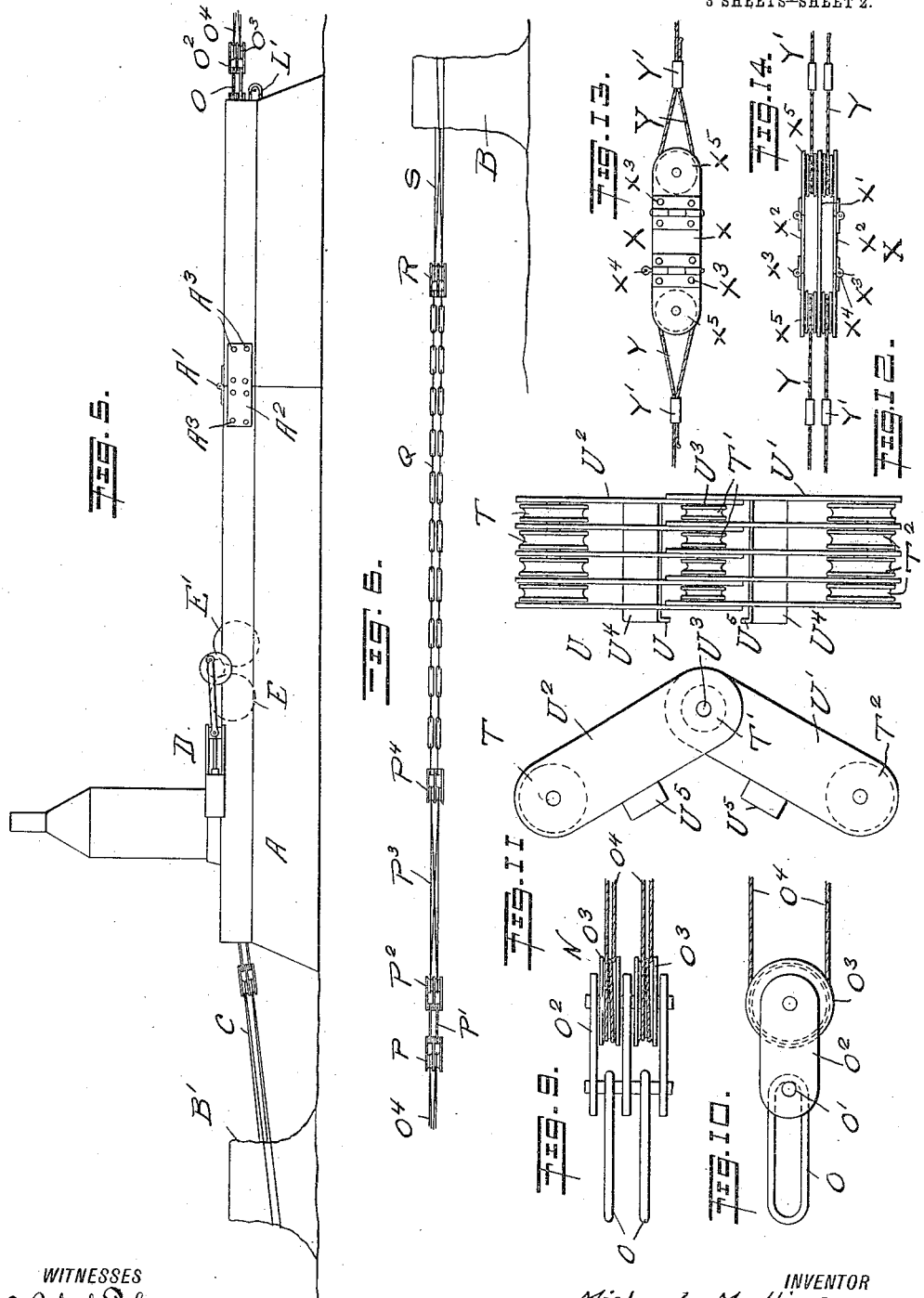

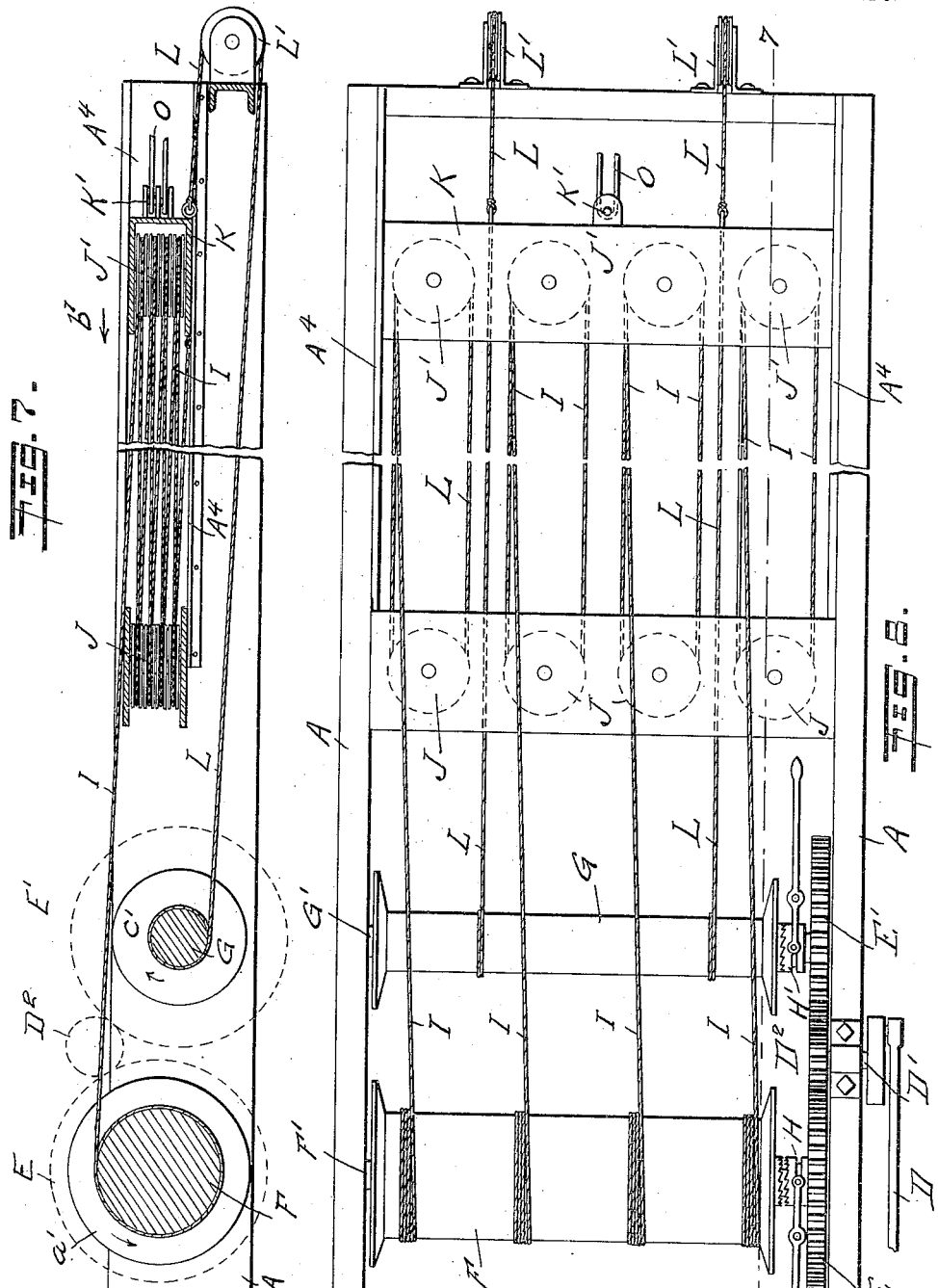

MICHAEL MULLINS, OF SEATTLE, WASHINGTON.

STUMP-PULLER.

1,136,702.   Specification of Letters Patent.   Patented Apr. 20, 1915.

Application filed July 22, 1912. Serial No. 710,820.

*To all whom it may concern:*

Be it known that I, MICHAEL MULLINS, a citizen of the United States, and a resident of Seattle, in the county of King and State of Washington, have invented a new and Improved Stump-Puller, of which the following is a full, clear, and exact description.

The object of the invention is to provide a new and improved stump puller arranged to permit of quickly pulling stumps out of the ground irrespective of their size, and to permit of folding the parts for convenient transportation from one place to another.

For the purpose mentioned use is made of a frame provided with a longitudinal guideway, a driven drum journaled in the said frame, a cross head or carriage mounted to slide in the said guideway, sets of frame sheaves journaled in the said frame, a set of cross head sheaves journaled in the cross head and arranged opposite the said frame sheaves, a cable fixed at one end to the cross head and winding at the other end on the said drum, the cable passing around the said frame sheaves and the said cross head sheaves, and a flexible pulling connection engaging the stump to be pulled and connected with the said cross head.

A practical embodiment of the invention is represented in the accompanying drawings forming a part of this specification, in which similar characters of reference indicate corresponding parts in all the views.

Figure 1 is a plan view of the stump puller arranged for pulling small stumps; Figs. 2, 3 and 4 are plan views of the flexible pulling connections for pulling larger stumps; Figs. 5 and 6 are side elevations of the stump puller; Fig. 7 is an enlarged sectional side elevation of the frame, the drums, cross head, sheaves and cables, the section being on the line 7—7 of Fig. 8; Fig. 8 is a plan view of the same; Fig. 9 is an enlarged side elevation of one of the members of one of the flexible pulling connections; Fig. 10 is a plan view of the same; Fig. 11 is an enlarged plan view of one of the saddles for engagement with a stump; Fig. 12 is a side elevation of the same; Fig. 13 is an enlarged plan view of the double block for lengthening or shortening a cable; and Fig. 14 is a side elevation of the same.

The main frame A of the stump puller may be mounted on skids or wheels to permit of conveniently moving the frame over the ground to a desired position a distance from a stump B to be pulled, as plainly indicated in Fig. 1. The frame A is preferably made in sections connected with each other by hinges A' to permit of doubling up the frame when moving it about from one place to another, the frame sections when the stump puller is in use being rigidly fastened together in extended position by fish plates $A^2$ extending across the joint of the sections and removably fastened thereto by bolts $A^3$. The rear end of the main frame A is connected by a flexible connection C with a large stump B' in the rear of the machine so as to hold the frame A against shifting toward the other stump B when pulling the same out of the ground, as hereinafter more fully described.

In the frame A near the rear end thereof is mounted a motor D, of any approved construction, and having a motor shaft D' carrying a pinion $D^2$ (see Fig. 8) in mesh on opposite sides with gear wheels E and E', mounted to turn loosely on the drum shafts F' and G' of drums F and G located between the side beams of the frame A, and having their shafts F' and G' journaled in the side beams of the main frame A. The gear wheels E and E' are adapted to be connected by suitable clutch mechanisms H and H' with the drums F and G so that either drum F or G can be rotated from the motor D whenever it is desired to do so and as hereinafter more fully explained.

On the drum F wind the ends of a number of cables I passing around sets of sheaves J, J', of which the sheaves J are journaled on the main frame A while the sheaves J' are journaled in a cross head or a carriage K mounted to slide longitudinally in guideways $A^4$ formed on the side beams of the main frame A. The cables I after leaving the lowermost of the sheaves J are fastened at this end to the bottom of the cross head or carriage K, as plainly indicated in Fig. 1, so that when the drum F is rotated in the direction of the arrow $a'$ (see Fig. 7) and the cables I are wound up on the said drum then a traveling motion is given to the cross head or carriage K in the direction of the arrow $b'$ owing to the connection of the cables I and sheaves J and J'.

On the drum G wind the ends of two cables L extending forwardly and passing over guide pulleys L' journaled on the front end of the main frame A, as plainly indicated in Figs. 7 and 8. The cables L again extend from the guide pulleys L' rearwardly and connect with the cross head or carriage K so that when the drum G is rotated in the direction of the arrow c' then the cables L are wound up, and in doing so pull the cross head or carriage K forwardly in the inverse direction of the arrow b'.

It is understood that normally the clutches H and H' are disconnected from the drums F and G, and when it is desired to rotate the drum F for drawing the cross head or carriage K in the direction of the arrow b' then the clutch mechanism H is thrown in and the motor D is started to rotate the drum F in the direction of the arrow a'. When it is desired to return the cross head or carriage K then the clutch mechanism H is thrown out of gear while the clutch mechanism H' is thrown into gear so that when the motor D is started the drum G is rotated to cause the cross head or carriage K to travel upwardly in the inverse direction of the arrow b'.

The forward end of the cross head or carriage K is connected by a flexible connection N with the stump B to be pulled, it being understood that when the drum F is rotated, as previously described and the cross head or carriage K is caused to travel in the direction of the arrow b' then the flexible connection N exerts a pull on the stump B to pull the same out of the ground.

The flexible connection N is preferably constructed as follows: A pair of links O engage a vertical pin K' held on the forward end of the cross head or carriage K, and the said links also engage a pin O' attached to a pulley block $O^2$ provided with two sheaves $O^3$ around which extends an endless cable $O^4$ connected with pulleys in another pulley block P connected by links P' with a pulley block $P^2$ connected by an endless cable $P^3$ with a pulley block $P^4$ connected with one end of chains Q connected at the other ends with a pulley block R connected by an endless cable S with the stump B to be pulled. Each of the cables $O^4$ and $P^3$ is given one full turn around the corresponding pulley in the pulley blocks $O^2$, $P^3$ and $P^4$, as will be readily understood by reference to Fig. 9.

When pulling a heavier stump $B^2$, as shown in Fig. 2, for instance, then a cable S' connected with the pulley block R passes over pulleys T, T' and $T^2$ of a saddle U having two members U' and $U^2$ connected with each other by a pivot $U^3$ on which the pulley T' are journaled. The pulleys T and $T^2$ are journaled in the outer ends of the sections U' and $U^2$, and the cable S' after leaving the pulleys $T^2$ connects with a pulley block R' connected by chains $R^2$ with a pulley block $R^3$ connected by a cable $S^2$ with a stump $B^3$ to give the desired resistance to the saddle U. The sections U' and $U^2$ of the saddle U are provided at their inner faces with vertical bars $U^4$ terminating in hooks $U^5$ (see Figs. 11 and 12) and adapted to hook onto the top of the stump so as to support the saddle U a short distance from the top of the stump. When pulling a still heavier stump $B^4$, as shown in Fig. 3, the following arrangement is made: A cable $S^3$ is guided over the pulleys T, T' and $T^2$ of the saddle U engaging the stump $B^4$, and one end of the cable $S^3$ is connected with the pulley block R and the other is connected with a pulley block $R^4$ engaged by chains $R^5$ with a pulley block $R^6$ connected with a cable $S^4$ passing around another saddle U held on a stump $B^5$ located a distance from the stump $B^4$ and in a direction toward the machine, as will be understood by reference to Fig. 3. The cable $S^4$ is connected by connected pulley blocks V by a cable V' with connected pulley blocks $V^2$ connected by a cable $V^3$ with connected pulley blocks $V^4$ connected with a cable $V^5$ passing around the stump $B^4$. The connected pulley blocks V and cable V' are similar to the ones above described in reference to the pulley blocks P, $P^2$, links P' and cable $P^3$, so that further description of the same is not deemed necessary. It is understood that the stump $B^5$ offers the desired resistance to the pull exerted for pulling the stump $B^4$ out of the ground when moving the cross head or carriage K rearward in the direction of the arrow b'. It is also understood that the cables $S^3$ and $S^4$ readily slide over the pulleys T, T' and $T^2$ in the saddles U engaging the stumps $B^4$ and $B^5$ to insure a proper pull on the stump $B^4$ with a view to dislodge the same from the ground. When it is desired to pull a still heavier stump $B^6$, as shown in Fig. 4, a saddle U engages the stump $B^6$ and a cable $S^5$ passes over the pulleys T, T', $T^2$ of the saddle U and one end of the cable $S^5$ is connected to the pulley block R while the other end is connected with a pulley block $R^6$ connected by chains $R^7$ with a pulley block $R^8$ connected with one end of a cable $S^6$ passing around the pulleys of another saddle U held on another resistance stump $B^7$ located a distance from the stump $B^6$ and toward the machine. The cable $S^6$ is connected by connected pulley blocks W with a cable W' connected by connected pulley blocks $W^2$ with a cable $S^7$ engaging a pulley block $W^3$ connected with a cable $S^8$ passing around the stump $B^6$, the cable $S^7$ being also connected by connected pulley blocks $W^4$ with a cable $W^5$ connected with connected pulley blocks $W^6$ engaged by a cable $S^9$ looped around the stump $B^7$ so that when a pull is exerted on the chains Q by the cross head or carriage K moving in the direction of the arrow b' then a pull is exerted on the stump $B^6$ to pull the same out of the ground, it being understood that by the connections described a slow strong pull is exerted on the pulling device to dislodge the stump $B^6$.

It is understood that the use of a number of connected tackles as described permits of exerting the desired pull on the stumps B, $B^2$, $B^4$ and $B^6$, according to their size to insure a ready pulling out of the stump without requiring more power on the part of the motor D.

When it is desired to lengthen or shorten a cable use is made of a pulley block X, as shown in Figs. 13 and 14, the pulley block shown being a double one having its central plate $X'$ and side plates $X^2$, each made in sections connected with each other by hinges $X^3$, the pintle $X^4$ of one being removable so as to permit of opening the section for access to the corresponding sheaves $X^5$ around which pass cables Y having their ends fastened by clamps $Y'$ to the run of the corresponding cable. To lengthen or shorten the cable the operator shifts the corresponding clamp $I'$ to make the loop engaging the corresponding pulley $X^5$ longer or shorter as the case may be.

Each cable $O^4$, P, S, $S'$, $S^2$, $S^3$, $S^4$, $V'$, $V^3$, $V^5$, $S^5$, $S^6$, $W'$, $S^7$, $S^8$, $W^5$ and $S^9$ passes around two pulleys in each corresponding block so that four equalizing strands or runs are provided in each cable. The necessity for four strands of each cable for heavy work instead of two is that the diameter of a cable which is practical to use in sheaves or pulleys is limited to say a 1½ inch cable, and the power of the cross head K is such that it will easily part any single cable under strain, and hence each cable is arranged to provide four strands to withstand a heavy strain and still permit easy handling of the cables and proper running of the cables around their sheaves or pulleys. Chains are used in the flexible connection N to permit of shortening or lengthening the said connections, it being understood that the chains can be readily shortened or lengthened but not the endless cables.

Having thus described my invention, I claim as new and desire to secure by Letters Patent:

1. A stump puller, comprising a frame provided with longitudinal guideways, a driven drum journaled in the said frame, a cross head mounted to slide in the said guideways, a set of sheaves journaled in the said frame, a set of cross head sheaves journaled in the said cross head and arranged opposite the said frame sheaves, a cable fixed at one end to the cross head and winding at the other end on the said drum, the cable passing around the said frame sheaves and the said cross head sheaves, a second driven drum journaled on the said frame, a guide pulley on the said frame, and a return cable attached at one end to the cross head, the return cable passing over the said guide pulley and winding on the said second drum, and a flexible pulling connection engaging the stump to be pulled and connected with the said cross head.

2. A stump puller, comprising a frame having longitudinal guideways, a cross head mounted to slide in the said guideways and having at one end means for attaching a flexible connection thereto, a driven drum mounted in the frame, a plurality of sets of sheaves mounted in the frame between the drum and cross head, and a plurality of cables each having one end secured to the drum and after passing around the several sheaves of each set of sheaves has its other end secured to the cross head.

3. A stump puller, comprising a frame provided with longitudinal guideways, a driven drum journaled in the said frame, a cross head mounted to slide in the said guideways, a set of frame sheaves journaled in the said frame, a set of cross head sheaves journaled in the said cross head and arranged opposite the said frame sheaves, a cable fixed at one end to the cross head and winding at the other end on the said drum, the cable passing around the said frame sheaves, and cross head sheaves, a second driven drum journaled on the said frame, a guide pulley on the said frame, a return cable attached at one end to the cross head, the return cable passing over the said guide pulley and winding on the said second drum, a flexible pulling connection engaging the stump to be pulled and connected with the said cross head, a motor mounted on the said frame and provided with a main shaft carrying a pinion, gear wheels in mesh with the said pinion, and clutches connecting the said gear wheels with the said drums to drive either of the latter from the said motor.

In testimony whereof I have signed my name to this specification in the presence of two subscribing witnesses.

MICHAEL MULLINS.

Witnesses:
CARL KROLL,
AUGUST MEHLHORN, Jr.